(12) United States Patent
Nihira et al.

(10) Patent No.: US 12,034,344 B2
(45) Date of Patent: Jul. 9, 2024

(54) INVERTER UNIT AND MOTOR UNIT (71) Applicant: NIDEC CORPORATION, Kyoto (JP)

(72) Inventors: Mizuki Nihira, Kyoto (JP); Naohiro Wada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 312 days.

(21) Appl. No.: 17/610,700

(22) PCT Filed: May 9, 2020

(86) PCT No.: PCT/JP2020/018750
§ 371 (c)(1),
(2) Date: Nov. 14, 2021

(87) PCT Pub. No.: WO2020/230749
PCT Pub. Date: Nov. 19, 2020

(65) Prior Publication Data
US 2022/0247281 A1    Aug. 4, 2022

(30) Foreign Application Priority Data
May 14, 2019 (JP) ................. 2019-091323

(51) Int. Cl.
*H02K 11/33* (2016.01)
*H02K 7/116* (2006.01)
*B60K 17/14* (2006.01)
(52) U.S. Cl.
CPC ............. *H02K 11/33* (2016.01); *H02K 7/116* (2013.01); *B60K 17/14* (2013.01); *H02K 2211/03* (2013.01)
(58) Field of Classification Search
CPC ................................ H02K 7/116; B60K 17/14
See application file for complete search history.

(56) References Cited

U.S. PATENT DOCUMENTS

| 7,847,450 B2 | 12/2010 | Kakuda et al. |
| 9,693,476 B2 | 6/2017 | Nagasawa et al. |
| 2009/0206709 A1* | 8/2009 | Kakuda ............ H02K 5/15 |
| | | 310/68 D |
| 2016/0079744 A1* | 3/2016 | Nagasawa ......... H05K 7/14329 |
| | | 361/699 |

FOREIGN PATENT DOCUMENTS

| JP | 2003199292 A | 7/2003 | |
| JP | 201110383 A | 1/2011 | |
| JP | 201554612 A | 3/2015 | |
| JP | 2015054612 A * | 3/2015 | ............ B60K 17/04 |
| WO | 2016110519 A1 | 7/2016 | |

OTHER PUBLICATIONS

JP-2015054612-A_translate (Year: 2015).*
International Search Report in PCT/JP2020/018750, mailed Jul. 14, 2020. 4pp.

* cited by examiner

*Primary Examiner* — Tulsidas C Patel
*Assistant Examiner* — Mohammed Ahmed Qureshi
(74) *Attorney, Agent, or Firm* — HAUPTMAN HAM, LLP (57) ABSTRACT

An inverter unit, provided in a motor unit that rotates an axle of a vehicle, includes an inverter, and an inverter case that houses the inverter therein. The inverter case includes an inverter case body that opens to one side in a predetermined direction, and a plate-shaped cover that closes an opening of the inverter case body. The cover has a raised portion raised in the predetermined direction. The raised portion has a hollow curved shape protruding in the predetermined direction.

15 Claims, 7 Drawing Sheets

INVERTER UNIT AND MOTOR UNIT

CROSS-REFERENCE TO RELATED APPLICATIONS

This is the U.S. national stage of application No. PCT/JP2020/018750, filed on May 9, 2020, and priority under 35 U.S.C. § 119(a) and 35 U.S.C. § 365(b) is claimed from Japanese Patent Application No. 2019-091323, filed on May 14, 2019.

FIELD OF THE INVENTION

The present invention relates to an inverter unit and a motor unit. The present application claims priority based on Japanese Patent Application No. 2019 091323 filed in Japan on May 14, 2019, the contents of which are incorporated herein by reference.

BACKGROUND

A motor drive unit in which an inverter case is fixed to a housing has been known. For example, a motor drive unit in which an inverter case and a housing are fixed by fastening pins is known.

A plate-shaped cover may be provided at the inverter case described above. In this case, vibrations generated in a motor, a reduction gear, and a differential provided in the motor drive unit are transmitted to the inverter case, and there is a problem that membrane vibrations easily occur in the cover.

SUMMARY

One aspect of an inverter unit of the present invention is an inverter unit that is provided in a motor unit that rotates an axle of a vehicle. The inverter unit includes an inverter, and an inverter case that houses the inverter therein. The inverter case includes an inverter case body that opens to one side in a predetermined direction, and a plate-shaped cover that closes an opening of the inverter case body. The cover has a raised portion raised in the predetermined direction. The raised portion has a hollow curved shape protruding in the predetermined direction.

One aspect of a motor unit of the present invention is a motor unit that rotates an axle of a vehicle. The motor unit includes a motor, a reduction gear that is connected to the motor, a differential that is connected to the motor with the reduction gear interposed therebetween, a housing that includes a motor housing portion housing the motor therein, and a gear housing portion housing the reduction gear and the differential therein, and the above-described inverter unit attached to the housing.

The above and other elements, features, steps, characteristics and advantages of the present disclosure will become more apparent from the following detailed description of the preferred embodiments with reference to the attached drawings.

DETAILED DESCRIPTION

The following description will be made with a vertical direction being defined based on a positional relationship when a motor unit 1 according to an embodiment illustrated in the drawings is mounted on a vehicle positioned on a horizontal road surface. In addition, in the drawings, an xyz coordinate system is illustrated appropriately as a three-dimensional orthogonal coordinate system. In the xyz coordinate system, a z-axis direction corresponds to the vertical direction. A +z side corresponds to an upper side in the vertical direction, while a −z side corresponds to a lower side in the vertical direction. In the following description, the upper side and the lower side in the vertical direction will be referred to simply as the "upper side" and the "lower side", respectively. An x-axis direction corresponds to a front-rear direction of the vehicle on which the motor unit is mounted, and is a direction orthogonal to the z-axis direction. In the embodiment described below, a +x side corresponds to a front side of the vehicle, while a −x side corresponds to a rear side of the vehicle. A y-axis direction is a direction orthogonal to both the x-axis direction and the z-axis direction, and is a left-right direction of the vehicle, or a vehicle lateral direction. In the embodiment described below, a +y side is a left side of the vehicle, and a −y side is a right side of the vehicle. Each of the front-rear direction and the left-right direction is a horizontal direction orthogonal to the vertical direction.

Note that, the definition of the front and rear sides in the front-rear direction is not limited to the definition of the embodiment described below, and that the +x side and the −x side may correspond to the rear side and the front side, respectively, of the vehicle. In this case, the +y side corresponds to the right side of the vehicle, while the −y side corresponds to the left side of the vehicle.

A motor axis J1 illustrated appropriately in the drawings extends in the y-axis direction, that is, the left-right direction of the vehicle. In the following description, unless otherwise specified, a direction parallel to the motor axis J1 is simply referred to as an "axial direction", a radial direction around the motor axis J1 is simply referred to as a "radial direction", and a circumferential direction about the motor axis J1, that is, about of the motor axis J1, is simply referred to as a "circumferential direction". Note that, in the present specification, a "parallel direction" includes a substantially parallel direction, and an "orthogonal direction" includes a substantially orthogonal direction.

In the present embodiment, the vertical direction corresponds to a predetermined direction. In the present embodiment, the upper side corresponds to one side in the predetermined direction, and the lower side corresponds to the other side in the predetermined direction. In the present embodiment, the left-right direction, that is, the axial direction corresponds to a first direction. In the present embodiment, the front-rear direction corresponds to a second direction. In the present embodiment, the front side corresponds to one side in the second direction.

Figure 1:
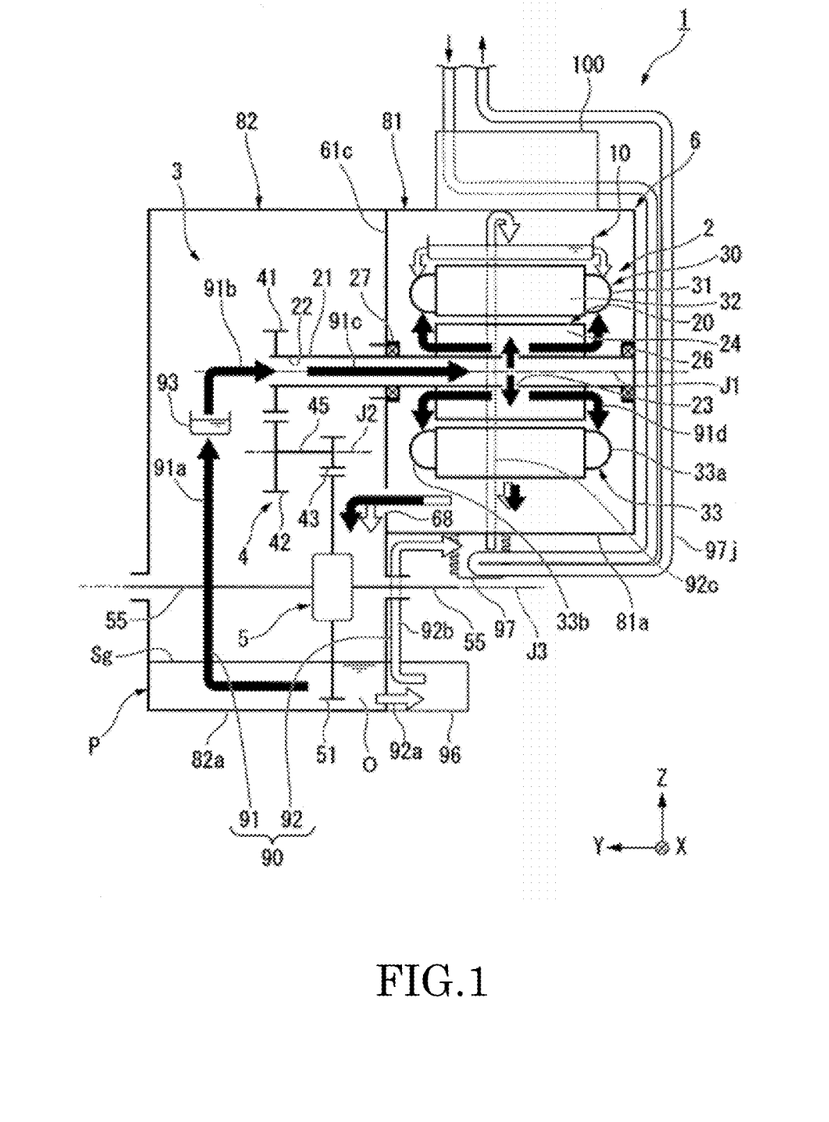
FIG. 1 is a schematic configuration diagram schematically illustrating a motor unit according to the present embodiment.

The motor unit 1 according to the present embodiment illustrated in FIG. 1 is mounted on a vehicle having a motor as a power source, such as a hybrid electric vehicle (HEV), a plug-in hybrid vehicle (PHV), or an electric vehicle (EV), and is used as the power source thereof. As illustrated in FIG. 1, the motor unit 1 includes a housing 6, an inverter unit 100, a motor 2, and a transmission 3. The transmission 3 includes a reduction gear 4 and a differential 5. That is, the motor unit 1 includes the reduction gear 4 and the differential 5.

The housing 6 includes a motor housing portion 81, a gear housing portion 82, and a partition wall 61c. That is, the motor unit 1 includes the motor housing portion 81, the gear housing portion 82, and the partition wall 61c. The motor housing portion 81 is a portion that houses a rotor 20 and a stator 30, to be described later, therein. The gear housing portion 82 is a portion that houses the transmission 3 therein. The gear housing portion 82 is positioned on the left side (+y side) of the motor housing portion 81. A bottom 81a of the motor housing portion 81 is positioned above a bottom 82a of the gear housing portion 82. The partition wall 61c partitions the inside of the motor housing portion 81 and the inside of the gear housing portion 82 from each other in the axial direction. The partition wall 61c includes a partition wall opening 68 defined therein. The partition wall opening 68 connects the inside of the motor housing portion 81 and the inside of the gear housing portion 82.

Oil O is contained in the motor housing portion 81 and the gear housing portion 82. An oil pool P in which the oil O is accumulated is provided in an inner lower region in the gear housing portion 82. The oil O in the oil pool P is fed to the inside of the motor housing portion 81 through an oil passage 90 to be described later. The oil O fed to the inside of the motor housing portion 81 is accumulated in an inner lower region of the motor housing portion 81. At least some of the oil O having accumulated in the inside of the motor housing portion 81 moves to the gear housing portion 82 through the partition wall opening 68 and is returned to the oil pool P.

Note that, in the present specification, "an oil is contained inside a certain portion" means that the oil may be positioned inside the certain portion at least partly during driving of the motor or the oil may not be positioned inside the certain portion when the motor is stopped. For example, in the present embodiment, "the oil O is contained inside the motor housing portion 81" means that the oil O may be positioned inside the motor housing portion 81 at least partly during driving of the motor 2 or all the oil O in the motor housing portion 81 may move to the gear housing portion 82 through the partition wall opening 68 when the motor 2 is stopped. Note that, some of the oil O fed to the inside of the motor housing portion 81 through the oil passage 90 to be described later may remain in the inside of the motor housing portion 81 in a state in which the motor 2 is stopped.

The oil O is circulated through the oil passage 90 to be described below. The oil O is used to lubricate the reduction gear 4 and the differential 5. In addition, the oil O is also used to cool the motor 2. As the oil O, an oil equivalent to a lubricating oil for an automatic transmission having a relatively low viscosity (ATF: Automatic Transmission Fluid) is preferably used such that the oil O can have functions of a lubricating oil and a cooling oil.

Figure 2:
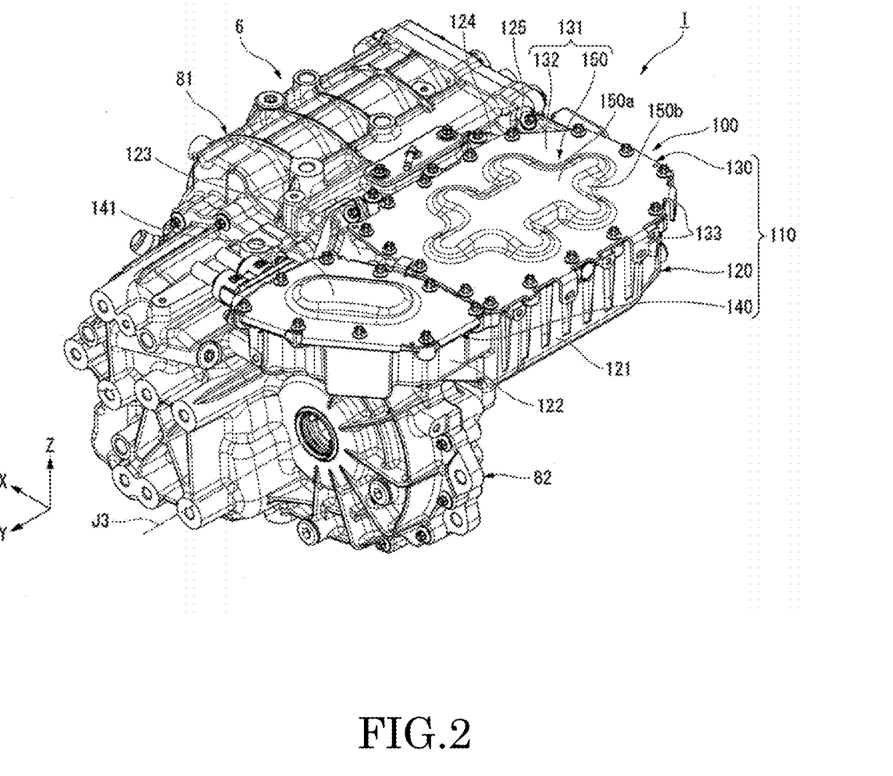
FIG. 2 is a perspective view illustrating the motor unit according to the present embodiment.

The bottom 82a of the gear housing portion 82 is positioned below the bottom 81a of the motor housing portion 81. Thus, the oil O fed from the gear housing portion 82 to the motor housing portion 81 easily flows into the gear housing portion 82 through the partition wall opening 68. As illustrated in FIG. 2, the gear housing portion 82 extends in the front-rear direction. An end of the gear housing portion 82 on the front side (+x side) is connected to an end of the motor housing portion 81 on the left side (+y side). An end of the gear housing portion 82 on the rear side (−x side) further protrudes rearward than the motor housing portion 81.

In the present embodiment, the motor 2 is an inner-rotor motor as illustrated in FIG. 1. The motor 2 includes the rotor 20, the stator 30, and bearings 26 and 27. The rotor 20 is capable of rotating about the motor axis J1, which extends in the horizontal direction orthogonal to the vertical direction. A torque of the rotor 20 is transmitted to the transmission 3. The rotor 20 includes a shaft 21 and a rotor body 24. Although not illustrated, the rotor body 24 includes a rotor core, and a rotor magnet fixed to the rotor core.

The shaft 21 extends in the axial direction with the motor axis J1 as a center. The shaft 21 rotates about the motor axis J1. The shaft 21 is a hollow shaft including a hollow portion 22 defined therein. The shaft 21 includes a communicating hole 23 defined therein. The communicating hole 23 extends in the radial direction to connect the hollow portion 22 to a space outside of the shaft 21.

The shaft 21 extends across the motor housing portion 81 and the gear housing portion 82 of the housing 6. An end of the shaft 21 on the left side (+y side) protrudes to the inside of the gear housing portion 82. A first gear 41, to be described later, of the transmission 3 is fixed to a left end of the shaft 21. The shaft 21 is rotatably supported by the bearings 26 and 27.

The stator 30 faces the rotor 20 in the radial direction with a gap interposed therebetween. In more detail, the stator 30 is positioned on an outer side of the rotor 20 in the radial direction. The stator 30 surrounds the rotor 20. The stator 30 includes a stator core 32 and a coil assembly 33. The stator core 32 is fixed to an inner peripheral surface of the motor housing portion 81. Although not illustrated, the stator core 32 includes a core back in a cylindrical shape extending in the axial direction, and a plurality of teeth extending to an inner side from the core back in the radial direction.

The coil assembly 33 includes a plurality of coils 31 attached to the stator core 32 along the circumferential direction. The plurality of coils 31 is attached to the teeth of the stator core 32 with insulators (not illustrated) interposed therebetween. The plurality of coils 31 is arranged along the circumferential direction. In more detail, the plurality of coils 31 is arranged at equal intervals over one circumference in the circumferential direction. Although not illustrated, in the present embodiment, the plurality of coils 31 is connected by a star connection to form an AC circuit of a plurality of phases. The plurality of coils 31 constitutes, for example, a three-phase AC circuit.

The coil assembly 33 includes coil ends 33a and 33b that protrude from the stator core 32 in the axial direction. The coil end 33a is a portion that protrudes on the right side (−y side) from the stator core 32. The coil end 33b is a portion that protrudes on the left side (+y side) from the stator core 32. The coil end 33a includes a portion of each of the coils 31 included in the coil assembly 33 which protrudes on the right side of the stator core 32. The coil end 33b includes a portion of each of the coils 31 included in the coil assembly 33 which protrudes on the left side of the stator core 32. In the present embodiment, the coil ends 33a and 33b are annular around the motor axis J1.

The bearings 26 and 27 rotatably support the rotor 20. Each of the bearings 26 and 27 is, for example, a ball bearing. The bearing 26 is a bearing that rotatably supports a portion of the rotor 20 which is positioned on the right side (−y side) of the stator core 32. In the present embodiment, the bearing 26 supports a portion of the shaft 21 which is positioned on the right side of a portion of the shaft to which the rotor body 24 is fixed. The bearing 26 is held by a wall portion of the motor housing portion 81 that covers the right side of the rotor 20 and the stator 30.

The bearing 27 rotatably supports a portion of the rotor 20 which is positioned on the left side (+y side) of the stator core 32. In the present embodiment, the bearing 27 supports a portion of the shaft 21 which is positioned on the left side of the portion of the shaft to which the rotor body 24 is fixed. The bearing 27 is held by the partition wall 61c.

The transmission 3 is housed in the gear housing portion 82 of the housing 6. The transmission 3 is connected to the motor 2. In more detail, the transmission 3 is connected to the end of the shaft 21 on the left side (+y side). The transmission 3 includes the reduction gear 4 and the differential 5. A torque output from the motor 2 is transmitted to the differential 5 through the reduction gear 4.

The reduction gear 4 is connected to the motor 2. The reduction gear 4 increases the torque output from the motor 2 in accordance with a reduction ratio while reducing a rotation speed of the motor 2. The reduction gear 4 transmits the torque output from the motor 2 to the differential 5. The reduction gear 4 includes the first gear 41, a second gear 42, a third gear 43, and an intermediate shaft 45.

The first gear 41 is fixed to an outer peripheral surface of the end of the shaft 21 on the left side (+y side). The first gear 41 rotates about the motor axis J1 together with the shaft 21. The intermediate shaft 45 extends along an intermediate axis J2 parallel to the motor axis J1. The intermediate shaft 45 rotates about the intermediate axis J2. Each of the second gear 42 and the third gear 43 is fixed to an outer peripheral surface of the intermediate shaft 45. The second gear 42 and the third gear 43 are connected to each other with the intermediate shaft 45 interposed therebetween. Each of the second gear 42 and the third gear 43 rotates about the intermediate axis J2. The second gear 42 meshes with the first gear 41. The third gear 43 meshes with a ring gear 51, to be described later, of the differential 5.

The torque output from the motor 2 is transmitted to the ring gear 51 of the differential 5 through the shaft 21, the first gear 41, the second gear 42, the intermediate shaft 45, and the third gear 43 in this order. A gear ratio of each gear, the number of gears, and the like can be variously changed according to a required reduction ratio. In the present embodiment, the reduction gear 4 is a parallel axis gear type reduction gear in which axes of the gears are arranged in parallel.

The differential 5 is connected to the motor 2 with the reduction gear 4 interposed therebetween. The differential 5 is a device that transmits the torque output from the motor 2 to wheels of the vehicle. The differential 5 transfers the same torque to axles 55 of both left and right wheels while absorbing a difference in speed between the left and right wheels when the vehicle is turning. The differential 5 includes the ring gear 51, a gear housing (not illustrated), a pair of pinion gears (not illustrated), a pinion shaft (not illustrated), and a pair of side gears (not illustrated). The ring gear 51 rotates about a differential axis J3 parallel to the motor axis J1. The torque output from the motor 2 is transferred to the ring gear 51 through the reduction gear 4.

A lower end of the ring gear 51 is positioned below an oil level Sg of the oil pool P in the gear housing portion 82. Accordingly, the lower end of the ring gear 51 is immersed in the oil O in the gear housing portion 82. In the present embodiment, the oil level Sg of the oil pool P is positioned below the differential axis J3 and the axle 55.

The oil passage 90 through which the oil O is circulated in the inside of the housing 6 is provided in the motor unit 1. The oil passage 90 is a channel of the oil O along which the oil O is supplied from the oil pool P to the motor 2 and is led back to the oil pool P. The oil passage 90 is provided across the inside of the motor housing portion 81 and the inside of the gear housing portion 82.

Note that, in the present specification, the "oil passage" refers to a channel of the oil. Accordingly, the concept "oil passage" includes not only a "flow passage", in which a steady flow of the oil in one direction is generated, but also a channel in which the oil is allowed to temporarily stay and a channel along which the oil drips. Examples of the channel in which the oil is allowed to temporarily stay include a reservoir that stores the oil.

The oil passage 90 includes a first oil passage 91 and a second oil passage 92. Each of the first oil passage 91 and the second oil passage 92 circulates the oil O in the inside of the housing 6. The first oil passage 91 includes a scraping-up channel 91a, a shaft supply channel 91b, an intra-shaft channel 91c, and an intra-rotor channel 91d. In addition, a first reservoir 93 is provided in the channel of the first oil passage 91. The first reservoir 93 is provided in the gear housing portion 82.

The scraping-up channel 91a is a channel along which the oil O is received by the first reservoir 93 by being scraped up from the oil pool P by rotation of the ring gear 51 of the differential 5. The first reservoir 93 opens to the upper side. The first reservoir 93 receives the oil O scraped up by the ring gear 51. In addition, the first reservoir 93 also receives the oil O scraped up by the second gear 42 and the third gear 43 in addition to the ring gear 51 when the oil level Sg of the oil pool P is high immediately after the motor 2 is driven.

The shaft supply channel 91b leads the oil O from the first reservoir 93 into the hollow portion 22 of the shaft 21. The intra-shaft channel 91c is a channel along which the oil O passes through the hollow portion 22 of the shaft 21. The intra-rotor channel 91d is a channel along which the oil O passes from the communicating hole 23 of the shaft 21 and the inside of the rotor body 24 and is scattered to the stator 30.

In the intra-shaft channel 91c, a centrifugal force is applied to the oil O in the inside of the rotor 20 due to the rotation of the rotor 20. Accordingly, the oil O is continuously scattered to the outer side from the rotor 20 in the radial direction. In addition, due to the scattering of the oil O, a negative pressure is generated in the channel in the inside of the rotor 20, the oil O accumulated in the first reservoir 93 is sucked into the inside of the rotor 20, and the channel in the inside of the rotor 20 is filled with the oil O.

The oil O which has reached the stator 30 absorbs heat from the stator 30. The oil O having cooled the stator 30 drips to the lower side, and is accumulated in the lower region in the motor housing portion 81. The oil O having accumulated in the lower region in the motor housing portion 81 moves to the gear housing portion 82 through the partition wall opening 68 provided in the partition wall 61c. In the above-described manner, the first oil passage 91 supplies the oil O to the rotor 20 and the stator 30.

In the second oil passage 92, the oil O is raised from the oil pool P to the upper side of the stator 30, and is supplied to the stator 30. That is, in the present embodiment, the motor unit 1 includes the second oil passage 92 as an oil passage for supplying the oil O to the stator 30 from the upper side. An oil pump 96, a cooler 97, and a second reservoir 10 are provided at the second oil passage 92. The second oil passage 92 includes a first flow passage 92a, a second flow passage 92b, and a third flow passage 92c.

Each of the first flow passage 92a, the second flow passage 92b, and the third flow passage 92c is provided at a wall portion of the housing 6. The first flow passage 92a connects the oil pool P and the oil pump 96. The second flow passage 92b connects the oil pump 96 and the cooler 97. The third flow passage 92c extends to the upper side from the cooler 97. The third flow passage 92c is provided at a wall of the motor housing portion 81. The third flow passage 92c opens to the inside of the motor housing portion 81 on the upper side of the stator 30.

The oil pump 96 is an electric pump driven by electricity. As illustrated in FIG. 1, the oil pump 96 sucks up the oil O from the oil pool P through the first flow passage 92a, and supplies the oil O to the motor 2 through the second flow passage 92b, the cooler 97, the third flow passage 92c, and the second reservoir 10.

The cooler 97 cools the oil O passing through the second oil passage 92. The second flow passage 92b and the third flow passage 92c are connected to the cooler 97. The second flow passage 92b and the third flow passage 92c are connected to each other through an internal flow passage of the cooler 97. A cooling water pipe 97j for causing cooling water cooled by a radiator (not illustrated) to pass is connected to the cooler 97. The oil O passing through the inside of the cooler 97 is cooled by heat exchange with the cooling water passing through the cooling water pipe 97j. Note that, the inverter unit 100 is provided in the channel of the cooling water pipe 97j. The cooling water passing through the cooling water pipe 97j cools the inverter unit 100.

In the present embodiment, the second reservoir 10 is in a shape of a gutter opening to the upper side. The second reservoir 10 stores the oil O. In the present embodiment, the second reservoir 10 stores the oil O supplied in the motor housing portion 81 via the third flow passage 92c. The second reservoir 10 includes a supply port for supplying the oil O to the coil ends 33a and 33b from the upper side. Accordingly, the oil O stored in the second reservoir 10 can be supplied to the stator 30.

The oil O supplied from the second reservoir 10 to the stator 30 drips to the lower side, and is accumulated in the lower region in the motor housing portion 81. The oil O having accumulated in the lower region in the motor housing portion 81 moves to the gear housing portion 82 through the partition wall opening 68 provided in the partition wall 61c. In the above-described manner, the second oil passage 92 supplies the oil O to the stator 30.

Figure 3:
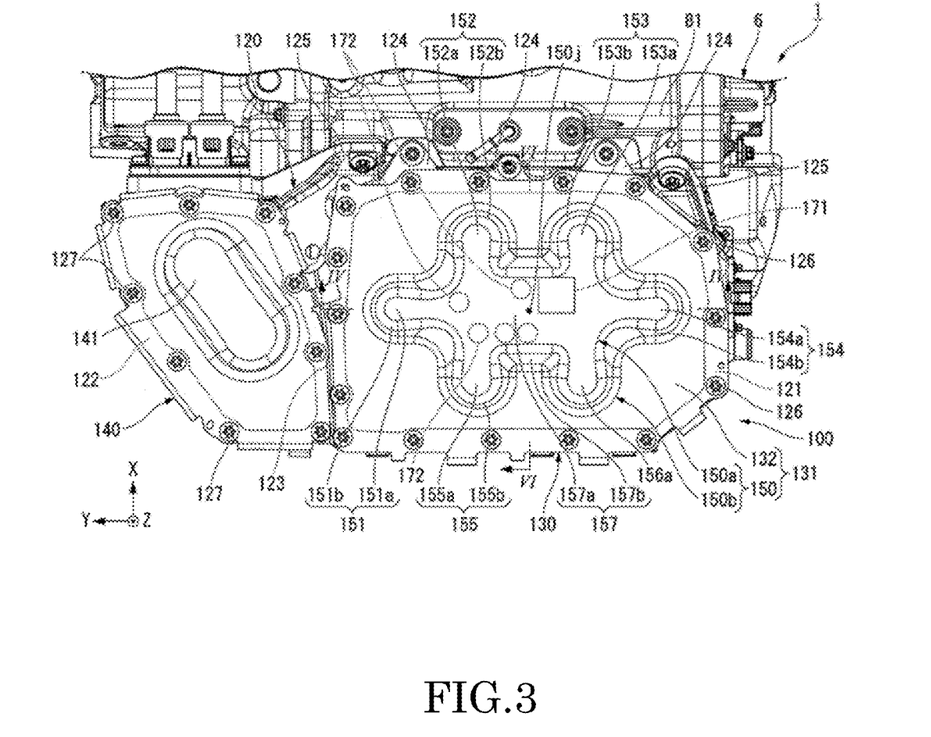
FIG. 3 is a diagram of a part of the motor unit according to the present embodiment as viewed from an upper side.
Figure 4:
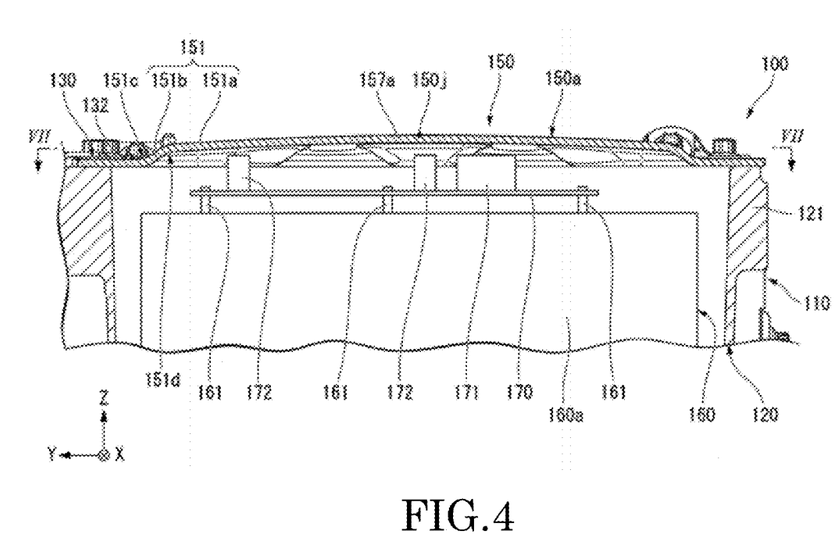
FIG. 4 is a partial cross-sectional view illustrating a part of an inverter unit according to the present embodiment and is a cross-sectional view taken along a line IV-IV in FIG. 3.

As illustrated in FIGS. 2 and 3, the inverter unit 100 is attached to the housing 6. In the present embodiment, the inverter unit 100 is positioned on the rear side (−x side) of the motor housing portion 81, and is attached to the motor housing portion 81 with a screw. The inverter unit 100 has a substantially rectangular parallelepiped shape elongated in the axial direction. As illustrated in FIG. 2, an end of the inverter unit 100 on the left side (+y side) is positioned above a portion of the gear housing portion 82 protruding to the rear side from the motor housing portion 81. As illustrated in FIG. 4, the inverter unit 100 includes an inverter case 110, an inverter 160, a circuit board 170, a transformer 171, and a plurality of capacitors 172.

The inverter case 110 houses the inverter 160, the circuit board 170, the transformer 171, and the plurality of capacitors 172 therein. As illustrated in FIGS. 2 and 3, the inverter case 110 has a substantially rectangular parallelepiped box shape elongated in the axial direction. The inverter case 110 is attached to the rear side (−x side) of the motor housing portion 81 with, for example, a screw. The inverter case 110 includes an inverter case body 120, an inverter cover 130, and a wiring portion cover 140.

The inverter case body 120 has a box shape opening to the upper side. The inverter case body 120 houses the inverter 160, the circuit board 170, the transformer 171, and the plurality of capacitors 172 therein. The inverter case body 120 includes an inverter housing portion 121, a wiring housing portion 122, a partition wall portion 123, and fixing portions 124 and 125. That is, the inverter case 110 includes the inverter housing portion 121, the wiring housing portion 122, the partition wall portion 123, and the fixing portions 124 and 125.

The inverter housing portion 121 is a portion that opens to the upper side and houses the inverter 160 therein. The inverter housing portion 121 is positioned on the rear side (−x side) of the motor housing portion 81. The wiring housing portion 122 is a portion that opens to the upper side and houses a wiring portion (not illustrated) therein. The wiring housing portion 122 is connected to the left side (+y side) of the inverter housing portion 121. The wiring housing portion 122 is positioned above a portion of the gear housing portion 82 protruding to the rear side from the motor housing portion 81. The wiring portion (not illustrated) housed inside the wiring housing portion 122 includes a bus bar electrically connected to the inverter 160.

The partition wall portion 123 is a wall portion that partitions the inside of the inverter housing portion 121 and the inside of the wiring housing portion 122 in the axial direction. Although not illustrated, a through-hole penetrating in the axial direction is provided in the partition wall portion 123. The above-described bus bar (not illustrated) extends from the inverter 160 to the inside of the wiring housing portion 122 via the through-hole provided in the partition wall portion 123.

The fixing portions 124 and 125 protrude to the front side (+x side) from an upper end of the inverter housing portion 121. The fixing portions 124 and 125 are provided at a front end of the inverter case 110. The fixing portions 124 and 125 are portions fixed to the motor housing portion 81. In the present embodiment, the fixing portions 124 and 125 are fixed to the motor housing portion 81 with screws. As illustrated in FIG. 3, three fixing portions 124 are provided at intervals in the circumferential direction. The screws for fixing the fixing portions 124 to the motor housing portion 81 extend in the vertical direction. A pair of fixing portions 125 are provided by sandwiching the three fixing portions 124 in the axial direction. The screws for fixing the fixing portions 125 to the motor housing portion 81 extend in a direction obliquely inclined in the front-rear direction with respect to the vertical direction. The screws for fixing the fixing portions 125 to the motor housing portion 81 are positioned on the front side from the upper side toward the lower side.

Figure 5:
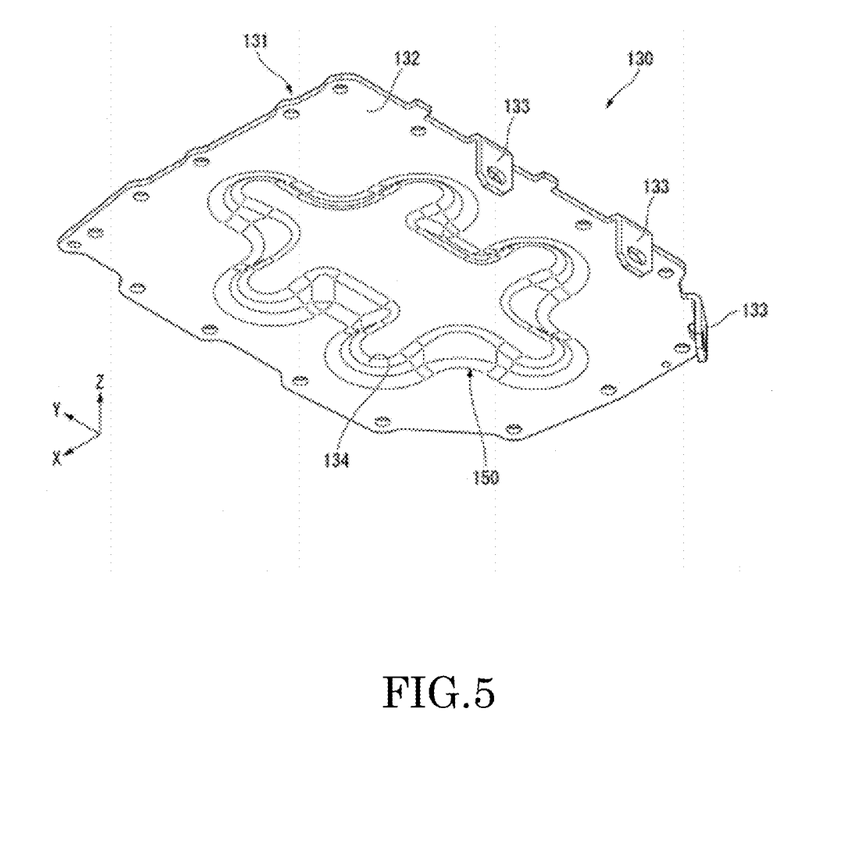
FIG. 5 is a perspective view illustrating an inverter cover according to the present embodiment.

The inverter cover 130 is a plate-shaped member that closes the opening of the inverter housing portion 121. That is, in the present embodiment, the inverter cover 130 corresponds to a cover that closes the opening of the inverter case body 120. In the present embodiment, the inverter cover 130 is a pressed product formed by pressing a plate member. In the present embodiment, the inverter cover 130 is fixed to an upper edge of the inverter housing portion 121 with a plurality of screws 126. As illustrated in FIGS. 3 to 5, the inverter cover 130 includes an inverter cover body 131 and a plurality of claw portions 133.

The inverter cover body 131 has a plate shape with plate faces facing in the vertical direction. The plurality of claw portions 133 protrudes to the lower side from an edge of the inverter cover body 131 on the rear side (-x side). The inverter cover body 131 includes a flat plate portion 132 having a flat plate shape and a raised portion 150 raised to the upper side with respect to the flat plate portion 132. That is, the inverter cover 130 includes the flat plate portion 132 and the raised portion 150 raised in the vertical direction. In the present embodiment, the raised portion 150 is a central portion of the inverter cover body 131 as viewed in the vertical direction. The entire circumference of the raised portion 150 is surrounded by the flat plate portion 132. An outer peripheral edge of the flat plate portion 132 is fixed to the upper edge of the inverter housing portion 121 with the plurality of screws 126.

The raised portion 150 is disposed to include a portion that becomes an antinode of a membrane vibration, for example, when the entire inverter cover body 131 has a flat plate shape. As illustrated in FIGS. 4 and 5, the raised portion 150 has a hollow curved shape protruding in the vertical direction. In the present embodiment, the raised portion 150 has a hollow shape that opens to the lower side and has a curved shape protruding to the upper side. The raised portion 150 is formed, for example, by plastically deforming a part of the plate-shaped inverter cover body 131 to the upper side by pressing. As illustrated in FIG. 5, the hollow raised portion 150 is provided, and thus, a recessed portion 134 recessed to the upper side is provided on a lower surface of the inverter cover 130.

The raised portion 150 raised in the vertical direction is provided, and thus, it is possible to increase bending rigidity of the inverter cover 130 in the vertical direction in the raised portion 150. Accordingly, even when vibration is transmitted from the motor 2 or the like to the inverter cover 130, it is possible to suppress occurrence of membrane vibrations in the inverter cover 130. In particular, a primary membrane vibration among the membrane vibrations occurring in the inverter cover 130 can be suitably suppressed. In addition, since the raised portion 150 is the hollow curved shape protruding in the vertical direction, the raised portion 150 has an arch shape and a dome shape or a shape close to the arch shape and the dome shape, and the bending rigidity of the raised portion 150 can be further increased. Accordingly, the occurrence of the membrane vibrations in the inverter cover 130 can be more suitably suppressed.

In addition, according to the present embodiment, the raised portion 150 is raised to the upper side. Thus, a capacity in the inverter case 110 can be increased, and each electronic component can be easily housed in the inverter case 110. In addition, it is possible to suppress formation of a recess on an upper surface of the inverter cover 130, and it is possible to suppress accumulation of foreign matter such as a liquid such as water or dust on the upper surface of the inverter cover 130.

In addition, according to the present embodiment, the inverter cover 130 is a pressed product. Thus, the raised portion 150 can be easily formed by pressing. In addition, a mass of the inverter cover 130 can be easily reduced as compared with die casting or the like, and a mass of the entire inverter unit 100 can be easily reduced. In addition, the manufacturing cost of the inverter cover 130 can be reduced.

Figure 6:
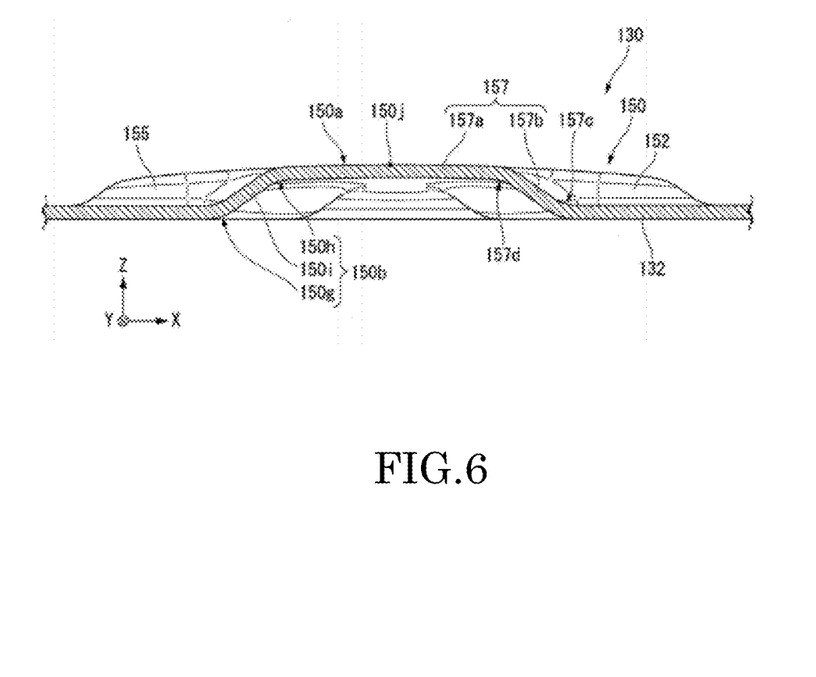
FIG. 6 is a cross-sectional view illustrating the inverter cover according to the present embodiment and is a cross-sectional view taken along a line VI-VI in FIG. 3.

As illustrated in FIG. 3, in the present embodiment, as viewed from above, the raised portion 150 has a substantially double cross shape including one vertical bar extending in the axial direction and two horizontal bars extending in the front-rear direction and crossing the vertical bar. In the present embodiment, the raised portion 150 includes a top wall portion 150a and a peripheral wall portion 150b. The top wall portion 150a has a plate shape with plate faces facing in the vertical direction. As illustrated in FIGS. 4 and 6, the top wall portion 150a is curved in an arc shape protruding to the upper side. A center of curvature of the top wall portion 150a is positioned below the inverter cover 130. A radius of curvature of the top wall portion 150a is larger than a radius of curvature of a first curved portion 150g and a radius of curvature of a second curved portion 150h to be described later. Thus, the radius of curvature of the top wall portion 150a can be set to be relatively large. Accordingly, a raised height of the top wall portion 150a can be easily reduced, and the bending rigidity of the inverter cover 130 can be increased while suppressing a raised height of the raised portion 150. Accordingly, it is possible to suppress the occurrence of the membrane vibration in the inverter cover 130 while suppressing an increase in a size of the inverter unit 100 in the vertical direction.

As illustrated in FIG. 3, a vertex 150j of the top wall portion 150a is positioned at a central portion of the inverter cover 130 as viewed in the vertical direction. Thus, it is easy to dispose a portion of the raised portion 150 positioned on an uppermost side, that is, a portion having a largest raised height, in a portion that is likely to become the antinode when the membrane vibrations occur in the inverter cover 130. Accordingly, it is possible to further suppress the occurrence of the membrane vibrations in the inverter cover 130. In the present embodiment, the vertex 150j is the portion of the raised portion 150 positioned on the uppermost side. The top wall portion 150a has the above-described substantially double cross shape as viewed from above.

The peripheral wall portion 150b connects an outer edge of the top wall portion 150a and a peripheral edge of the raised portion 150 of the inverter cover 130. The peripheral edge of the raised portion 150 of the inverter cover 130 is a part of the flat plate portion 132. The peripheral wall portion 150b is inclined in a direction positioned on the inner side of the raised portion 150 toward the upper side from the peripheral edge of the raised portion 150 of the inverter cover 130. That is, the raised portion 150 has a shape in which an outer shape viewed from above decreases from the lower side toward the upper side. The peripheral wall portion 150b is inclined in the direction positioned on the inner side of the raised portion 150 from the lower side toward the upper side in this manner, and thus, the bending rigidity of the inverter cover 130 can be further increased. Accordingly, the occurrence of the membrane vibrations in the inverter cover 130 can be more suitably suppressed. In the present embodiment, the top wall portion 150a and the peripheral wall portion 150b form the raised portion 150 having the curved shape protruding to the upper side as a whole.

As illustrated in FIG. 6, the peripheral wall portion 150b includes a body portion 150i, the first curved portion 150g, and the second curved portion 150h. The first curved portion 150g is a lower end of the peripheral wall portion 150b. The second curved portion 150h is an upper end of the peripheral wall portion 150b. The body portion 150i connects the first curved portion 150g and the second curved portion 150h of the peripheral wall portion 150b.

In a cross section orthogonal to a direction in which the peripheral wall portion 150b extends, the body portion 150i extends linearly while being inclined in the direction positioned on the inner side of the raised portion 150 from the lower side toward the upper side. An angle at which the body portion 150i is inclined with respect to the horizontal direction is, for example, about 30° or more and 40° or less. As described above, the bending rigidity of the inverter cover 130 is easily increased by setting an inclination angle of the body portion 150i of the peripheral wall portion 150b with respect to the horizontal direction to be relatively small. Thus, the occurrence of the membrane vibrations in the inverter cover 130 can be more suitably suppressed.

The first curved portion 150g is a portion of the peripheral wall portion 150b connected to the peripheral edge of the raised portion 150, that is, the flat plate portion 132. The first curved portion 150g is curved in an arc shape in the cross section orthogonal to the direction in which the peripheral wall portion 150b extends. The first curved portion 150g is curved in an arc shape in a direction protruding to the inner side and obliquely on the lower side. A center of curvature of the first curved portion 150g is positioned above the inverter cover 130.

The second curved portion 150h is an upper end of the peripheral wall portion 150b, and is a portion of the peripheral wall portion 150b connected to the top wall portion 150a. The second curved portion 150h is curved in an arc shape in the cross section orthogonal to the direction in which the peripheral wall portion 150b extends. The second curved portion 150h is curved in an arc shape in a direction protruding to the outer side and diagonally on the upper side. A center of curvature of the second curved portion 150h is positioned below the inverter cover 130.

As described above, the bending rigidity of the inverter cover 130 can be more easily increased by bending connecting portions of the peripheral wall portion 150b with the flat plate portion 132 and the top wall portion 150a, and the occurrence of the membrane vibrations in the inverter cover 130 can be more suitably suppressed.

In the present embodiment, the radius of curvature of the first curved portion 150g and the radius of curvature of the second curved portion 150h are equal to each other. That is, a radius of curvature of an outer surface of the first curved portion 150g facing the outside of the inverter case 110 and a radius of curvature of an inner surface of the second curved portion 150h facing the inside of the inverter case 110 are equal to each other. Thus, the flat plate portion 132 and the top wall portion 150a connected by the peripheral wall portion 150b can have substantially the same angle with respect to the horizontal direction. Accordingly, the radius of curvature of the top wall portion 150a can be set to be relatively large, and an increase in the raised height of the raised portion 150 can be suppressed. Accordingly, it is possible to suppress the increase in the size of the inverter unit 100 in the vertical direction.

As illustrated in FIG. 3, in the present embodiment, the raised portion 150 has a central raised portion 157, and two first extending raised portions 151 and 154 and four second extending raised portions 152, 153, 155, and 156 as a plurality of extending raised portions. The central raised portion 157 is positioned at the central portion of the inverter cover 130 as viewed in the vertical direction. The central raised portion 157 has a substantially rectangular shape elongated in the axial direction as viewed from above. The central raised portion 157 includes a central top wall portion 150a constituting a part of the top wall portion 157a and a side wall portion 157b constituting a part of the peripheral wall portion 150b.

In the present embodiment, the central top wall portion 157a constitutes a central portion of the top wall portion 150a. A center of the central top wall portion 157a viewed from above is the vertex 150j of the central top wall portion 157a. That is, the portion of the raised portion 150 positioned on the uppermost side is provided at the central raised portion 157. In the present embodiment, the side wall portions 157b are provided on both sides of the center top wall portion 157a in the front-rear direction. As illustrated in FIG. 6, a portion of the side wall portion 157b connected to the flat plate portion 132 is a curved portion 157c and is a part of the first curved portion 150g. A portion of the side wall portion 157b connected to the center top wall portion 157a is a curved portion 157d and is a part of the second curved portion 150h.

The first extending raised portions 151 and 154 and the second extending raised portions 152, 153, 155, and 156 extend to the outer side from the central raised portion 157 as viewed in the vertical direction. The first extending raised portions 151 and 154 and the second extending raised portions 152, 153, 155, and 156 are provided as the plurality of extending raised portions in this manner, and thus, it is possible to provide a rib extending from an outer peripheral edge of the inverter cover 130 fixed to the inverter housing portion 121 with a screw toward the central portion of the inverter cover 130 which is likely to be the antinode of the membrane vibrations. Thus, the bending rigidity of the inverter cover 130 against the membrane vibrations can be further increased, and the occurrence of the membrane vibrations in the inverter cover 130 can be more suitably suppressed.

In addition, according to the present embodiment, the portion of the raised portion 150 positioned on the uppermost side is provided in the central raised portion 157. Thus, the raised height of the raised portion 150 is easily increased from the outer peripheral edge of the inverter cover 130 fixed to the inverter housing portion 121 with the screw toward the central portion of the inverter cover 130 which is likely to be the antinode of the membrane vibrations. Accordingly, the bending rigidity of the inverter cover 130 can be more easily increased, and the occurrence of the membrane vibrations in the inverter cover 130 can be more suitably suppressed.

The first extending raised portions 151 and 154 extend in the axial direction orthogonal to the vertical direction. The second extending raised portions 152, 153, 155, and 156 extend in the front-rear direction orthogonal to both the vertical direction and the axial direction. As described above, the extending raised portions extending in the directions orthogonal to each other are provided, and thus, the bending rigidity of the inverter cover 130 can be easily increased. Accordingly, the occurrence of the membrane vibrations in the inverter cover 130 can be more suitably suppressed.

In addition, the inverter case 110 includes the fixing portions 124 and 125 fixed to the motor housing portion 81 at the end on the front side (+x side). Thus, the inverter case 110 is attached to the rear side (−x side) of the motor housing portion 81. Accordingly, the vibration of the motor 2 is transmitted to the inverter case 110 from the front side in the front-rear direction. On the other hand, the second extending raised portions 152, 153, 155, and 156 extend in the front-rear direction. Thus, it is easy to further increase the bending rigidity of the inverter cover 130 against the vibration of the motor 2 transmitted through the motor housing portion 81 by the second extending raised portions 152, 153, 155, and 156. Accordingly, it is possible to more suitably suppress the occurrence of the membrane vibrations in the inverter cover 130.

The first extending raised portion 151 extends to the left side (+y side) from the central raised portion 157. The first extending raised portion 154 extends to the right side (−y side) from the central raised portion 157. The first extending raised portion 151 and the first extending raised portion 154 are arranged on the same straight line extending in the axial direction. The first extending raised portion 151 includes an extending top wall portion 151a constituting a part of the top wall portion 150a and a side wall portion 151b constituting a part of the peripheral wall portion 150b. The first extending raised portion 154 includes an extending top wall portion 154a constituting a part of the top wall portion 150a and a side wall portion 154b constituting a part of the peripheral wall portion 150b.

As illustrated in FIG. 4, a portion of the side wall portion 151b connected to the flat plate portion 132 is a curved portion 151c and is a part of the first curved portion 150g. A portion of the side wall portion 151b connected to the extending top wall portion 151a is a curved portion 151d and is a part of the second curved portion 150h. In addition, similarly to the side wall portion 154b, a portion of the side wall portion 151b connected to the flat plate portion 132 is also a part of the first curved portion 150g. Similarly to the side wall portion 151b, a portion of the side wall portion 154b connected to the extending top wall portion 154a is also a part of the second curved portion 150h.

As illustrated in FIG. 3, the pair of second extending raised portions 152 and 153 extend to the front side (+x side) from the central raised portion 157. The second extending raised portion 152 and the second extending raised portion 153 are arranged at intervals in the axial direction. The second extending raised portion 152 is positioned on the left side (+y side) of the second extending raised portion 153. In the present embodiment, the pair of second extending raised portions 152 and 153 extend from both ends of the central raised portion 157 in the axial direction, in the front-rear direction.

The pair of second extending raised portions 155 and 156 extend to the rear side (−x side) from the central raised portion 157. The second extending raised portion 155 and the second extending raised portion 156 are arranged at intervals in the axial direction. The second extending raised portion 155 is positioned on the left side (+y side) of the second extending raised portion 156. In the present embodiment, the pair of second extending raised portions 155 and 156 extend from both the ends of the central raised portion 157 in the axial direction, in the front-rear direction. The second extending raised portion 152 and the second extending raised portion 155 are arranged on the same straight line extending in the front-rear direction. The second extending raised portion 153 and the second extending raised portion 156 are arranged on the same straight line extending in the front-rear direction.

The six extending raised portions are arranged in this manner, and thus, it is easy to relatively uniformly increase the bending rigidity of the inverter cover 130 even in a portion from any position of the outer peripheral edge of the inverter cover 130 toward the central portion of the inverter cover 130 while reducing the number of extending raised portions. Thus, the raised portion 150 can be easily formed, and the membrane vibrations in the inverter cover 130 can be suitably suppressed.

The second extending raised portion 152 includes an extending top wall portion 152a constituting a part of the top wall portion 150a and a side wall portion 152b constituting a part of the peripheral wall portion 150b. The second extending raised portion 153 includes an extending top wall portion 153a constituting a part of the top wall portion 150a and a side wall portion 153b constituting a part of the peripheral wall portion 150b. The second extending raised portion 155 includes an extending top wall portion 155a constituting a part of the top wall portion 150a and a side wall portion 155b constituting a part of the peripheral wall portion 150b. The second extending raised portion 156 includes an extending top wall portion 156a constituting a part of the top wall portion 150a and a side wall portion 156b constituting a part of the peripheral wall portion 150b.

In the present embodiment, the top wall portion 150a includes the central top wall portion 157a and extending top wall portions 151a, 152a, 153a, 154a, 155a, and 156a. The extending top wall portions 151a and 154a extend from the central top wall portion 157a in the axial direction. The extending top wall portions 152a, 153a, 155a, and 156a extend from the central top wall portion 157a in the front-rear direction.

In the present embodiment, the peripheral wall portion 150b is provided by connecting the side wall portion 151b, the side wall portion 152b, a portion of the side wall portion 157b positioned on the front side (+x side) of the central top wall portion 157a, the side wall portion 153b, the side wall portion 154b, the side wall portion 156b, a portion of the side wall portion 157b positioned on the rear side (−x side) of the central top wall portion 157a, and the side wall portion 155b in this order. That is, the side wall portion 152b of the second extending raised portion 152 connects the side wall portion 157b of the central raised portion 157 and the side wall portion 151b of the first extending raised portion 151.

Figure 7:
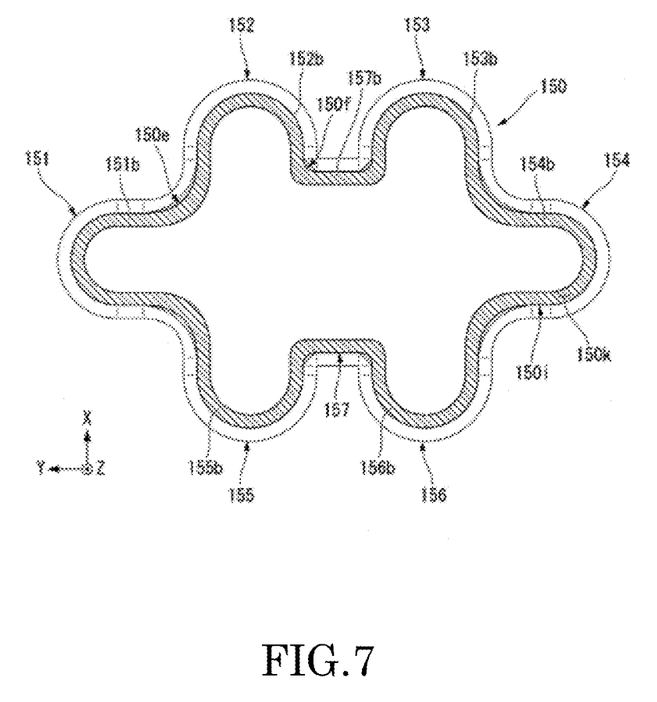
FIG. 7 is a cross-sectional view illustrating the inverter cover according to the present embodiment and is a cross-sectional view taken along a line VII-VII in FIG. 4.

As illustrated in FIG. 7, in a cross section 150k orthogonal to the vertical direction, a first connecting portion 150e which is a connecting portion between the side wall portion 152b of the second extending raised portion 152 and the side wall portion 151b of the first extending raised portion 151, and a second connecting portion 150f which is a connecting portion between the side wall portion 152b of the second extending raised portion 152 and the side wall portion 157b of the central raised portion 157 are curved in an arc shape. The cross section 150k is a cross section passing through the body portion 150i of the peripheral wall portion 150b. A radius of curvature of the first connecting portion 150e is larger than a radius of curvature of the second connecting portion 150f. Thus, the radius of curvature of the first connecting portion 150e can be relatively large, and the first connecting portion 150e can be easily protruded to the outer side of the raised portion 150 as compared with the case where the radius of curvature of the first connecting portion 150e is small. Accordingly, the bending rigidity of the inverter cover 130 can be further increased, and the occurrence of the membrane vibrations in the inverter cover 130 can be further suppressed.

Note that, in the present specification, "the first connecting portion 150e and the second connecting portion 150f are curved in the arc shape" means that the first connecting portion 150e and the second connecting portion 150f may be curved in the arc shape at least in the cross section 150k passing through the body portion 150i of the peripheral wall portion 150b and orthogonal to the vertical direction as illustrated in FIG. 7. In addition, in the present specification, "the radius of curvature of the first connecting portion 150*e* is larger than the radius of curvature of the second connecting portion 150*f*" means that the radius of curvature of the first connecting portion 150*e* may be larger than the radius of curvature of the second connecting portion 150*f* at least in the cross section 150*k*.

Dimensions of the first extending raised portions 151 and 154 in the axial direction are equal to each other. Dimensions of the second extending raised portions 152, 153, 155, and 156 in the front-rear direction are equal to each other. The dimensions of the first extending raised portions 151 and 154 in the axial direction are larger than the dimensions of the second extending raised portions 152, 153, 155, and 156 in the front-rear direction.

As viewed in the vertical direction, distal ends of the first extending raised portions 151 and 154 and distal ends of the second extending raised portions 152, 153, 155, and 156 are rounded. Radiuses of curvature of the distal ends of the second extending raised portions 152, 153, 155, and 156 are larger than the radiuses of curvature of the distal ends of the first extending raised portions 151 and 154. Thus, it is easy to relatively increase dimensions of the second extending raised portions 152, 153, 155, and 156 in the axial direction. Accordingly, the bending rigidity of the inverter cover 130 can be easily increased with respect to the vibration of the motor 2 transmitted from the front side (+x side). Accordingly, the occurrence of the membrane vibrations in the inverter cover 130 can be further suppressed.

Note that, in the present specification, "the radiuses of curvature of the distal ends of the second extending raised portions 152, 153, 155, and 156 are larger than the radiuses of curvature of the distal ends of the first extending raised portions 151 and 154." means that the radiuses of curvature of the distal ends of the second extending raised portions 152, 153, 155, and 156 may be larger than the radiuses of curvature of the distal ends of the first extending raised portions 151 and 154 at least in the cross section 150*k* passing through the body portion 150*i* of the peripheral wall portion 150*b* and orthogonal to the vertical direction. In the present embodiment, the radiuses of curvature of the distal ends of the first extending raised portions 151 and 154 are larger than the radiuses of curvature of the distal ends of the second extending raised portions 152, 153, 155, and 156 on any plane passing through the second extending raised portions 152, 153, 155, and 156 and the first extending raised portions 151 and 154 and orthogonal to the vertical direction.

The wiring portion cover 140 is a plate-shaped member that closes the opening of the wiring housing portion 122. That is, in the present embodiment, the wiring portion cover 140 corresponds to the cover that closes the opening of the inverter case body 120. In the present embodiment, the wiring portion cover 140 is a pressed product formed by pressing a plate member. In the present embodiment, the wiring portion cover 140 is fixed to an upper edge of the wiring housing portion 122 with a plurality of screws 127. The wiring portion cover 140 has a raised portion 141 raised in the vertical direction. In the present embodiment, the raised portion 141 is raised to the upper side. The raised portion 141 has an oval shape as viewed from above. Although not illustrated, the raised portion 141 has a hollow curved shape protruding to the lower side. Thus, similarly to the above-described raised portion 150, the raised portion 141 can suppress the occurrence of the membrane vibrations in the wiring portion cover 140.

The inverter 160 supplies a power to the motor 2. Although not illustrated, the inverter 160 includes a plurality of transistors and a plurality of capacitors. As illustrated in FIG. 4, the inverter 160 includes a capacitor case 160*a* that houses the plurality of capacitors (not illustrated). The capacitor case 160*a* has a rectangular parallelepiped box shape. The plurality of transistors (not illustrated) is positioned below the capacitor case 160*a*.

The circuit board 170 has a plate shape with plate faces facing in the vertical direction. In the present embodiment, the circuit board 170 is a control board that controls the inverter 160. The circuit board 170 is positioned above the inverter 160. The circuit board 170 is attached to an upper side of the capacitor case 160*a* with a support portion 161 provided on the upper surface of the capacitor case 160*a* interposed therebetween. The transformer 171 and the plurality of capacitors 172 are a plurality of electronic components attached to an upper surface of the circuit board 170. At least a part of the transformer 171 and the plurality of capacitors 172 is housed inside the raised portion 150. As described above, the inside of the raised portion 150 is used as a housing space for the electronic components, and thus, the electronic components having a relatively large dimension in the vertical direction can be easily housed inside the inverter case 110 while suppressing the dimension of the entire inverter case 110 in the vertical direction.

In the present embodiment, an upper end of the transformer 171 and upper ends of the plurality of capacitors 172 are housed inside the central raised portion 157 of the raised portion 150. As illustrated in FIG. 3, one transformer 171 is provided, for example. For example, five capacitors 172 are provided. The one transformer 171 and the five capacitors 172 overlap the center top wall portion 157*a* of the center raised portion 157 as viewed in the vertical direction.

The present invention is not limited to the above-described embodiment, and other configurations may be adopted. The shape of the raised portion is not particularly limited as long as the shape is the hollow curved shape protruding in the predetermined direction (vertical direction). The raised portion may be raised to the other side in the predetermined direction. That is, for example, in the above-described embodiment, the raised portion 150 may be raised to the lower side. In this case, the raised portion 150 is the hollow portion opening to the upper side, and the recess recessed to the lower side is provided in the inverter cover 130 as viewed from the outside of the inverter case 110. Even in such a case, it is possible to suppress the occurrence of the membrane vibrations in the inverter cover 130. In addition, the raised portion 141 may be raised to the lower side.

The number of the extending raised portions is not particularly limited, and may be one or more, five or less, or seven or more. The extending raised portions are not necessarily provided. The outer shape of the raised portion as viewed in the predetermined direction may be a circular shape or a polygonal shape. A part of the electronic components may not be housed in the raised portion.

In the above-described embodiment, although the two covers for closing the opening of the inverter case body are the inverter cover 130 and the wiring portion cover 140, the present invention is not limited thereto. The inverter cover 130 and the wiring portion cover 140 may be the same single member, and one cover for closing the opening of the inverter case body may be provided. In addition, for example, in the above-described embodiment, when the raised portion is provided in any one of the inverter cover 130 and the wiring portion cover 140, the raised portion may not be provided on the other case. The cover that closes the opening of the inverter case body may be a cast product formed by die casting or the like.

The configurations described in the present description can be combined as appropriate within a scope that does not give rise to mutual contraction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An inverter unit that is provided in a motor unit that rotates an axle of a vehicle, the inverter unit comprising:
an inverter; and
an inverter case that houses the inverter therein,
wherein the inverter case includes
an inverter case body that opens to one side in a predetermined direction, and
a plate-shaped cover that closes an opening of the inverter case body,
the cover has a raised portion raised in the predetermined direction, and
the raised portion has a hollow curved shape protruding in the predetermined direction, and
the raised portion includes a central raised portion positioned in a central portion of the cover as viewed in the predetermined direction, and a plurality of extending raised portions extending to an outer side from the central raised portion as viewed in the predetermined direction, and
the extending raised portion includes a first extending raised portion extending in a first direction orthogonal to the predetermined direction, and a second extending raised portion extending in a second direction orthogonal to both the predetermined direction and the first direction.

2. The inverter unit according to claim 1, wherein the raised portion is raised to the one side in the predetermined direction.

3. The inverter unit according to claim 2, wherein
the raised portion includes
a top wall portion that is curved in an arc shape protruding to the one side in the predetermined direction, and
a peripheral wall portion that connects an outer peripheral edge of the top wall portion and a peripheral edge of the raised portion of the cover, and
the peripheral wall portion is inclined in a direction positioned on an inner side of the raised portion from the peripheral edge of the raised portion of the cover toward the one side in the predetermined direction.

4. The inverter unit according to claim 3, wherein
a portion of the peripheral wall portion connected to the peripheral edge of the raised portion is a first curved portion curved in an arc shape in a cross section orthogonal to a direction in which the peripheral wall portion extends, and
a portion of the peripheral wall portion connected to the top wall portion is a second curved portion curved in an arc shape in the cross section orthogonal to the direction in which the peripheral wall portion extends.

5. The inverter unit according to claim 4, wherein a radius of curvature of an outer surface of the first curved portion facing an outside of the inverter case and a radius of curvature of an inner surface of the second curved portion facing an inside of the inverter case are equal to each other.

6. The inverter unit according to claim 4, wherein a radius of curvature of the top wall portion is larger than a radius of curvature of the first curved portion and a radius of curvature of the second curved portion.

7. The inverter unit according to claim 3, wherein a vertex of the top wall portion is positioned in a central portion of the cover as viewed in the predetermined direction.

8. The inverter unit according to claim 1, wherein a portion of the raised portion positioned closest to the one side in the predetermined direction is provided at the central raised portion.

9. The inverter unit according to claim 1, wherein a distal end of the first extending raised portion and a distal end of the second extending raised portion are rounded as viewed in the predetermined direction, and a radius of curvature of the distal end of the second extending raised portion is larger than a radius of curvature of the distal end of the first extending raised portion.

10. The inverter unit according to claim 1, wherein
the motor unit includes a motor housing portion that houses a motor therein, and
the inverter case includes a fixing portion fixed to the motor housing portion at an end on one side in the second direction.

11. The inverter unit according to claim 1, wherein
the first extending raised portion includes a first extending raised portion extending from the central raised portion to one side in the first direction, and a first extending raised portion extending from the central raised portion to the other side in the first direction, and
the second extending raised portion includes a pair of second extending raised portions extending from the central raised portion to one side in the second direction, and a pair of second extending raised portions extending from the central raised portion to the other side in the second direction.

12. The inverter unit according to claim 11, wherein
the pair of second extending raised portions extend, in the second direction, from both ends of the central raised portion in the first direction,
a side wall portion of the second extending raised portion connects a side wall portion of the central raised portion and a side wall portion of the first extending raised portion,
a first connecting portion which is a connecting portion between the side wall portion of the second extending raised portion and the side wall portion of the first extending raised portion and a second connecting portion which is a connecting portion between the side wall portion of the second extending raised portion and the side wall portion of the central raised portion are curved in an arc shape in a cross section orthogonal to the predetermined direction, and
a radius of curvature of the first connecting portion is larger than a radius of curvature of the second connecting portion.

13. The inverter unit according to claim 1, further comprising:
a circuit board that is housed inside the inverter case body; and
a plurality of electronic components that is attached to a surface of the circuit board on the one side in the predetermined direction, wherein at least a part of the electronic components is housed inside the raised portion.

14. The inverter unit according to claim 1, wherein the cover is a pressed product.

15. A motor unit that rotates an axle of a vehicle, the motor unit comprising:
a motor;
a reduction gear that is connected to the motor;
a differential that is connected to the motor with the reduction gear interposed therebetween;
a housing that includes a motor housing portion housing the motor therein, and a gear housing portion housing the reduction gear and the differential therein; and
the inverter unit according to claim 1 attached to the housing.

* * * * *